US012703516B2

(12) United States Patent
Sims et al.

(10) Patent No.: US 12,703,516 B2
(45) Date of Patent: Aug. 11, 2026

(54) PASSIVE FIDUCIAL MARKERS AND ASSOCIATED SYSTEMS AND METHODS

(71) Applicant: Orbit Fab, Inc., Lafayette, CO (US)

(72) Inventors: Daniel Sims, Wimauma, FL (US); Benjamin Pemble, Westminster, CO (US); Gareth Doskey, Boulder, CO (US); Anna Humphreys, Denver, CO (US); Daniel G. Mogab, Lakewood, CO (US); David L. Richardson, Berthoud, CO (US)

(73) Assignee: Orbit Fab, Inc., Lafayette, CO (US)

( * ) Notice: Subject to any disclaimer, the term of this patent is extended or adjusted under 35 U.S.C. 154(b) by 0 days.

(21) Appl. No.: 18/637,384

(22) Filed: Apr. 16, 2024

(65) Prior Publication Data

US 2025/0319995 A1 Oct. 16, 2025

(51) Int. Cl.
*B64G 1/64* (2006.01)
*B64G 1/24* (2006.01)

(52) U.S. Cl.
CPC ........... *B64G 1/6462* (2023.08); *B64G 1/247* (2023.08)

(58) Field of Classification Search
CPC .... B64G 1/6462; B64G 1/247; B64G 1/4024; G06T 2207/30204; G06T 2207/70–73; G06T 2207/30252; G06V 20/56; G05D 1/2446; G05D 1/654; B64U 70/95; B64F 1/18; B64F 1/20
See application file for complete search history.

(56) References Cited

U.S. PATENT DOCUMENTS

| | | | | |
|---|---|---|---|---|
| 6,768,126 B2 * | 7/2004 | Novak | ..................... | H05B 3/28 250/493.1 |
| 7,834,318 B1 * | 11/2010 | Cosimi | ..................... | F41J 2/02 250/330 |
| 11,358,739 B2 | 6/2022 | Faber | | |
| 2020/0143564 A1 * | 5/2020 | Ross | ..................... | B25J 9/1679 |
| 2021/0225033 A1 * | 7/2021 | Yuan | ..................... | G06T 7/80 |

(Continued)

OTHER PUBLICATIONS

Skelton et al., Rendezvous Fiducial Implementation in A Space Vehicle Life Cycle, Feb. 7, 2024, American Astronautical Society, 46th Rocky Mountain AAS GN&C Conference (Year: 2024).*

(Continued)

*Primary Examiner* — Medhat Badawi
*Assistant Examiner* — Vicente Rodriguez
(74) *Attorney, Agent, or Firm* — Perkins Coie LLP

(57) ABSTRACT

A representative system for docking a first spacecraft to a second spacecraft can include a fiducial marker carried by the second spacecraft, wherein the fiducial marker includes a metal substrate and a surface treatment forming a computer-readable image on the metal substrate. The computer-readable image can include a pattern of a plurality of blocks (e.g., an ArUCo pattern), in which one or more first blocks of the plurality of blocks includes a first coating having a first emissivity and a first solar radiation absorption coefficient, and one or more second blocks of the plurality of blocks is uncoated or includes a second coating that has a second emissivity and a second solar radiation absorption coefficient. In some embodiments, the first emissivity is less than the second emissivity and the first solar radiation absorption coefficient is greater than the second solar radiation absorption coefficient.

23 Claims, 5 Drawing Sheets

(56) References Cited

U.S. PATENT DOCUMENTS

| | | | | |
|---|---|---|---|---|
| 2021/0300602 | A1 | 9/2021 | Bultitude et al. | |
| 2022/0374667 | A1 | 11/2022 | Duarte et al. | |
| 2023/0016398 | A1 | 1/2023 | Deuitch et al. | |
| 2023/0400296 | A1 * | 12/2023 | Adams | G06T 7/73 |

OTHER PUBLICATIONS

Calib.io—Camera Calibration, "Custom Products," https://calib.io/pages/custom-products, accessed Mar. 7, 2023, 6 pages.
Cejka et al., "Detecting Square Markers in Underwater Environments," Remote Sens., www.mdpi.com/journal/remotesensing, 2019, 23 pages.
Cejka et al., "Improving Marker-Based Tracking for Augmented Reality in Underwater Environments" Eurographics Workshop on Graphics and Cultural Heritage, 2018, 10 pages.
Dogan et al., "InfraredTags: Embedding Invisible AR Markers and Barcodes Using Low-Cost, Infrared-Based 3D Printing and Imaging Tools," CHI, New Orleans, LA, USA, 2022, 12 pages.
Khattak et al., "Marker Based Thermal-Inertial Localization for Aerial Robots in Obscurant Filled Environments," Springer Nature, Switzerland AG, www.autonomousrobotslab.com, 2018, 11 pages.
Schramm et al., "Iterative feature detection of a coded checkerboard target for the geometric calibration of infrared cameras," JSSS—Journal of Sensors and Sensor Systems, 2021, 12 pages.
"ArUco markers generator!" https://chev.me/arucogen/ Online ArUco markers generator, accessed May 16, 2024, 1 page.

* cited by examiner

PASSIVE FIDUCIAL MARKERS AND ASSOCIATED SYSTEMS AND METHODS

TECHNICAL FIELD

The present disclosure is directed generally to fiducial markers for collocating spacecraft during docking operations, and associated systems and methods.

BACKGROUND

Existing space systems have several drawbacks. For example, launch vehicles may have limited volume and mass capacities. Spacecraft, such as satellites and/or other machines for traveling in space, are often launched to orbit with a limited quantity of fuel on board due to size and/or cost restrictions that must be balanced when designing the spacecraft for a particular mission. Accordingly, space missions may have limited lifetimes and/or utility due to limited fuel. Likewise, features and functions of spacecraft, such as the type and quantity of payload the spacecraft itself may carry, may be limited and/or compromised because the spacecraft may need to be launched full of all of the fuel it will need for its entire lifetime. Accordingly, there is a need for systems and methods to refuel spacecraft, especially spacecraft with long lifecycles intended to be on orbit for extended periods of time.

Refueling a satellite is difficult or impossible with many existing systems. For example, many existing docking systems and procedures are complicated and two satellites or vehicles may have incompatible docking systems or no docking systems. Many existing docking systems are also difficult or impossible to use autonomously. Existing docking systems may also have inadequate or inefficient targeting systems for aligning the spacecraft or their material transfer ports for docking. For example, existing systems may require heaters to heat the targets, which increases the spacecraft's energy requirements and reduces overall mission efficiency.

BRIEF DESCRIPTION OF THE DRAWINGS

In the drawings, the same reference number indicates the same element throughout the several views.

DETAILED DESCRIPTION

Figure 1:
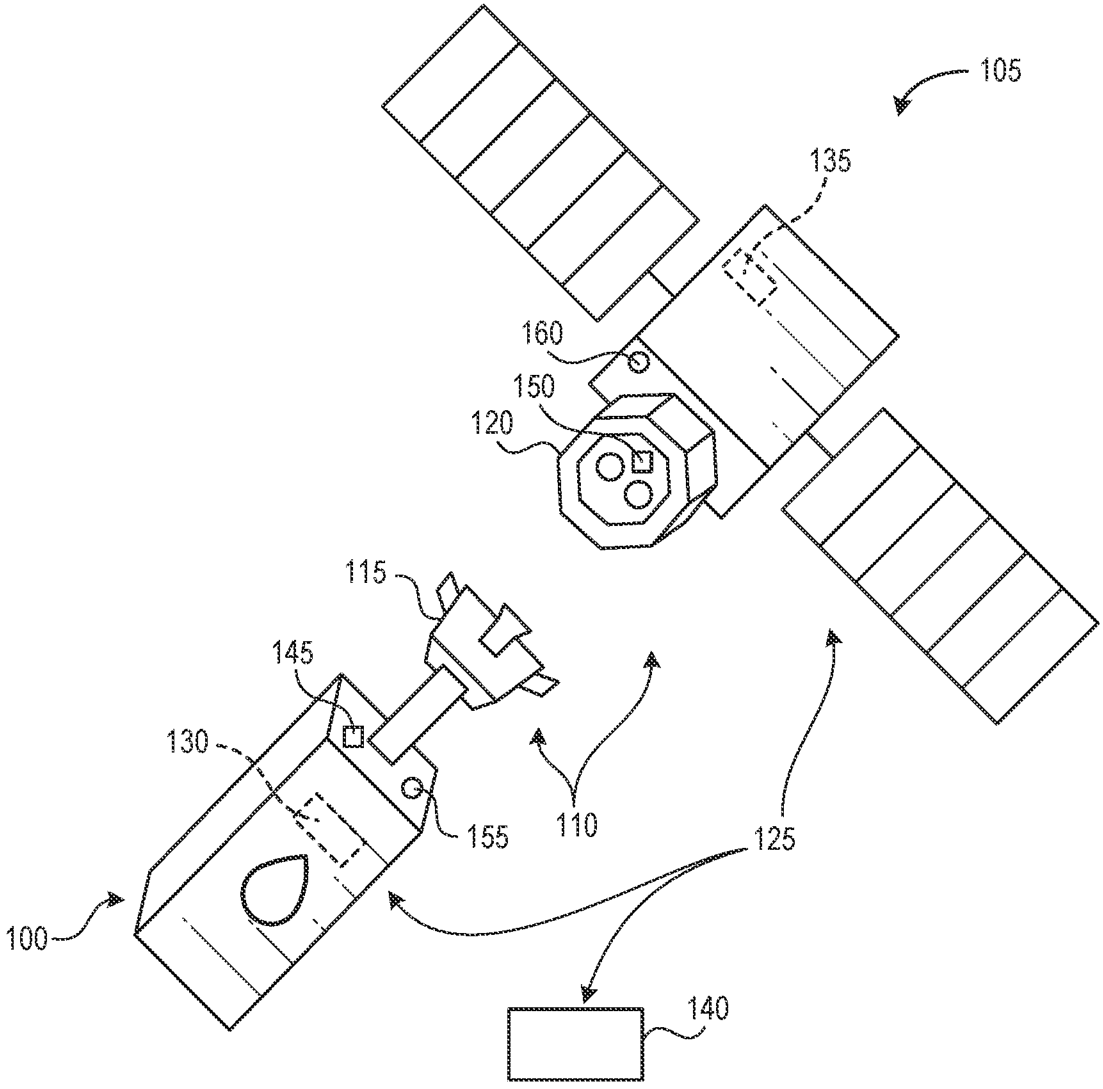
FIG. 1 is a partially schematic, isometric illustration of a first spacecraft positioned to dock with a second spacecraft to transfer materials between the two spacecraft.

Several embodiments of the present technology are directed to passive fiducial markers (which may also be called targets) for docking spacecraft or other vehicles, and associated systems and methods. A representative fiducial marker system for docking a first spacecraft to a second spacecraft can include a fiducial marker carried by the second spacecraft, wherein the fiducial marker includes a metal substrate and a surface treatment forming a computer-readable image on the metal substrate. The computer-readable image can include a pattern of a plurality of blocks (e.g., an ArUCo pattern) in which one or more first blocks of the plurality of blocks includes a first coating having a first emissivity and a first solar radiation absorption coefficient, and one or more second blocks of the plurality of blocks is uncoated or includes a second coating that has a second emissivity and a second solar radiation absorption coefficient. In some embodiments, the first emissivity is less than the second emissivity and the first solar radiation absorption coefficient is greater than the second solar radiation absorption coefficient.

Many specific details of some embodiments of the present technology are set forth in the following description and FIGS. 1-5 to provide a thorough understanding of these embodiments. Well-known structures, systems, and methods that are often associated with such embodiments, but that may unnecessarily obscure some significant aspects of the disclosure, are not set forth in the following description for purposes of clarity. Moreover, although the following disclosure sets forth some embodiments of the technology, other embodiments of the technology can have different configurations and/or different components than those described herein. As such, the technology can include embodiments with additional elements, and/or without several of the elements described below with reference to FIGS. 1-5.

Several embodiments of the technology described below can take the form of computer- or controller-executable instructions, including routines executed by a programmable computer or controller. Those skilled in the relevant art will appreciate that the technology can be practiced on computer/controller systems other than those shown and described below. The technology can be embodied in a special-purpose computer, controller, or data processor that is specifically programmed, configured, or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multiprocessor systems, processor-based or programmable consumer electronics, network computers, mini-computers and the like). Information handled by these computers can be presented at any suitable display medium, including an LCD.

The technology can also be practiced in distributed environments, where tasks or modules are performed by remote processing devices that are linked through a communications network. In a distributed computing environment, program modules and/or subroutines can be located in local and remote memory storage devices. Aspects of the technology described below can be stored and/or distributed on computer-readable media, including magnetic or optically readable or removable computer disks, as well as distributed electronically over networks. Data structures and transmissions of data particular to aspects of the technology are also encompassed within the scope of the embodiments of the technology.

Reference is made herein to "space." Space includes orbital space near or around the Earth, the Moon, and/or another planetary body. A person of ordinary skill in the art will also recognize that embodiments of the present technology can be implemented near or on other planetary or lunar surfaces. A person of ordinary skill in the art will understand that a spacecraft can include any human-made object in space.

A. System Overview

The present disclosure describes systems and/or devices for assisting spacecraft or other vehicles or objects in docking operations by providing markers to track for alignment and mating. Although some embodiments are directed to autonomous material transfer activities, activities performed by systems and/or spacecraft disclosed herein can be semi-autonomous or non-autonomous, and can include assistance by robots, artificial intelligence, and/or humans.

FIG. 1 is a partially schematic, isometric illustration of a first vehicle 100 (e.g., a first space vehicle or spacecraft) positioned to dock with a second vehicle 105 (e.g., a second space vehicle or spacecraft) to transfer materials between the two vehicles.

In a particular embodiment, the first vehicle 100 is or includes a service vehicle, for example, a space tug, or a fuel transfer vehicle. The second vehicle 105 can be or include a satellite, or another space vehicle to which materials are delivered, and/or from which materials are received. To transfer materials between the two vehicles 100, 105, each vehicle includes a portion of an overall transfer interface system 110. The first vehicle 100 can include a first coupler 115, and the second vehicle 105 can include a second coupler 120. In many instances, fluids are transferred between the first vehicle 100 and the second vehicle 105, although other material transfer interface systems may be implemented in various embodiments for transferring other materials, energy, human ingress or egress, etc. In general, embodiments of the present technology can be implemented in any docking system or procedure. Embodiments of the present technology facilitate docking the couplers 115, 120 together.

The transfer interface system 110 can include a controller system 125 including one or more controllers that, with or without human assistance, directs the operation of coupling the two vehicles 100, 105, and/or transferring materials between the two vehicles. The controller system 125 can accordingly include a first controller 130 carried by the first vehicle 100, and a second controller 135 carried by the second vehicle 105. The controller system 125 can further include an off-board controller 140 that is carried by neither the first vehicle 100 nor the second vehicle 105, but is instead located externally. For example, the off-board controller 140 can be carried or positioned on Earth or another body. Transfer interface systems and methods can include those described in U.S. Patent Application Publication No. 2021/0300602, and/or in U.S. Patent Application Publication No. 2023/0016398, and/or in U.S. Patent Application No. 63/572,127, and/or they may be implemented in systems and methods for delivering, storing, and/or processing materials in space described in U.S. Pat. No. 11,358,739, all four of which are incorporated herein by reference.

In some embodiments, the first vehicle 100 can carry a first fiducial marker 145 (e.g., on or near the first coupler 115), and/or the second vehicle 105 can carry a second fiducial marker 150 (e.g., on or near the second coupler 120). The first vehicle 100 can carry a first imager 155 (e.g., on or near the first coupler 115) for viewing the second fiducial marker 150 (if any), and/or the second vehicle 105 can carry a second imager 160 (e.g., on or near the second coupler 120) for viewing the first fiducial marker 145 (if any). Each imager 155, 160 on one vehicle observes and/or analyzes the fiducial marker 145, 150 on the other vehicle (optionally in coordination with one or more of the controllers 130, 135, 140) to determine orientation, distance, and/or other relative positioning of the two vehicles 100, 105 so one or both of the vehicles 100, 105 can be navigated and/or aligned toward one another for docking (e.g., via autonomous, semi-autonomous, or manual control of each space vehicle using conventional or other systems and methods of propulsion and/or guidance, navigation, and control). The sizes, positions, and/or shapes of the fiducial markers 145, 150 and the imagers 155, 160 are only shown schematically in FIG. 1, and fiducial markers and imagers configured in accordance with embodiments of the present technology may have other positions or configurations (e.g., they may extend from booms on the vehicle and/or integrated into other aspects of the vehicles, etc.). The imagers 155, 160 can include sensors for detecting and/or producing images based on infrared light, such as light in the long-wavelength infrared (LWIR) spectrum, which can include wavelengths between 8000 nanometers and 14,000 nanometers, and/or other infrared wavelengths.

Embodiments of the present technology include the fiducial markers 145, 150, and associated systems and methods, which can include locating, reading, and/or interpreting the fiducial markers 145, 150 in, for example, an infrared spectrum.

B. Fiducial Markers

Figure 2B:
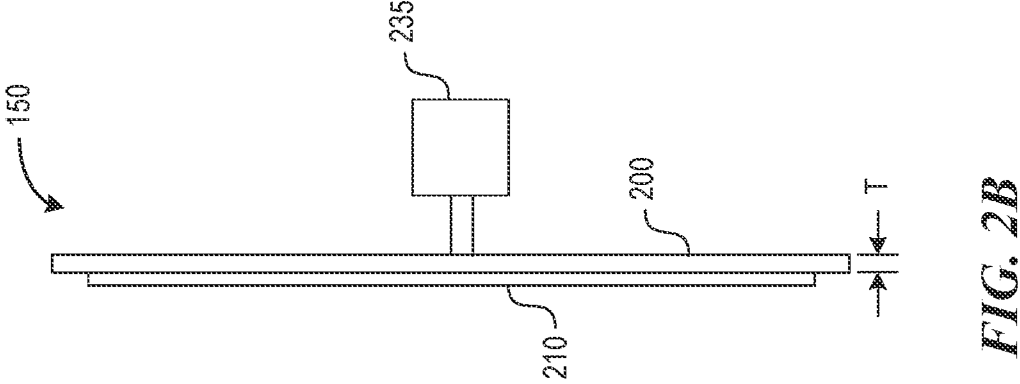
FIG. 2B is a partially schematic side view of the fiducial marker shown in FIG. 2A.
Figure 2A:
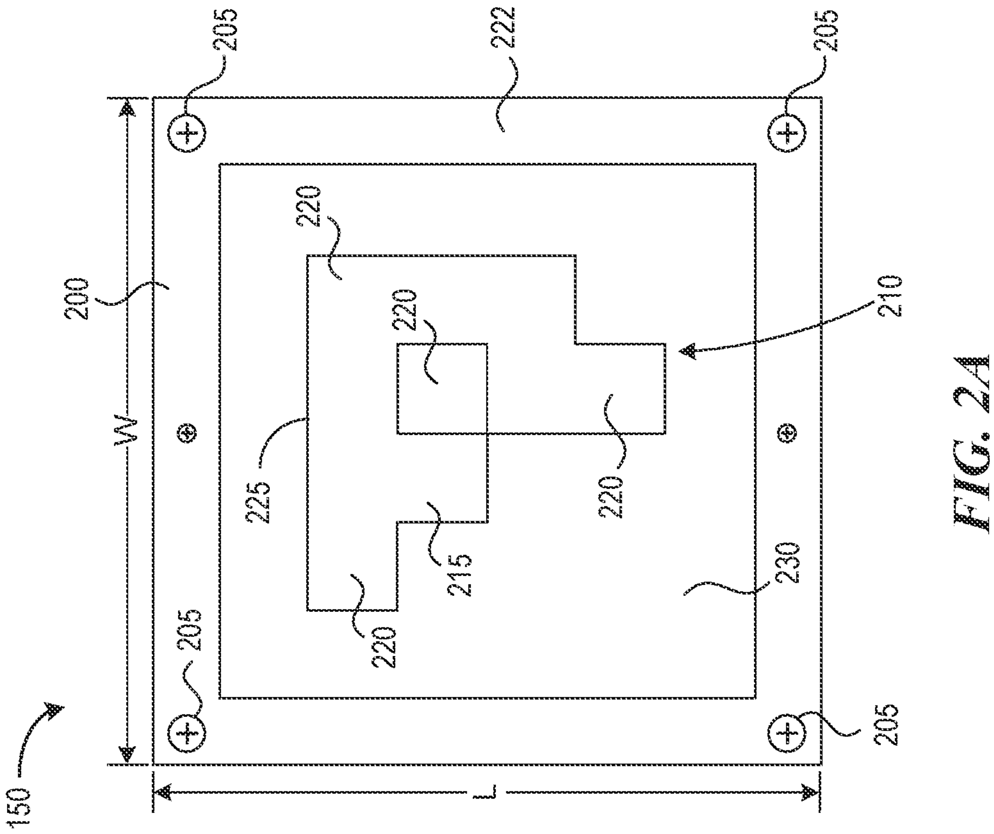
FIG. 2A is a partially schematic plan view of a representative fiducial marker configured in accordance with embodiments of the present technology.

FIG. 2A is a partially schematic plan view of the fiducial marker 150 (hereinafter referred to as a "marker" 150 for convenience) configured in accordance with embodiments of the present technology. Other fiducial markers (e.g., the fiducial marker 145 described above) can be the same or similar. FIG. 2B is a partially schematic side view of the fiducial marker 150 shown in FIG. 2A.

With reference to FIGS. 2A and 2B, the marker 150 can include a substrate 200 including a metal material, such as aluminum, an aluminum alloy, stainless steel, or another suitable metal material or combination of metal materials. In some embodiments, the material is light weight and thermally conductive. The substrate can be attached to a spacecraft, for example, via one or more fasteners 205 or another suitable attachment. A representative substrate 200 can optionally be approximately five inches in width W, five inches in length L, and 0.125 inches in thickness T, although these dimensions are for example only and markers 150 configured in accordance with embodiment of the present technology may be larger (e.g., much larger) or smaller (e.g., much smaller), depending on implementation and factors such as the sizes of the vehicle 100, 105 and/or the initial distance and/or relative orientation between the vehicles 100, 105.

With specific reference to FIG. 2A, the marker 150 can further include a surface treatment 210 on the substrate 200. The surface treatment 210 can form a computer-readable image 215 suitable for pose estimation. For example, an imager (e.g., the imager 155 carried by the first vehicle 100) can view the image 215 and the one or more controllers 130, 140 can interpret the image 215 to determine a relative distance, orientation, and/or position of the marker 150 (and, consequently, of the second vehicle 105). In some embodiments, the image 215 can include a pattern that represents information, e.g., in the form of an Augmented Reality University of Cordoba ("ArUco") pattern, a Quick Response ("QR") pattern, and/or another pattern that can represent information. Accordingly, in some embodiments, the image 215 can include a binary image in the form of a pattern of blocks 220 with each block 220 being one of two colors (e.g., light or dark, such as white or black), such that the blocks are binary elements of the code (e.g., a monochromatic binary image). The blocks 220 may be connected or separate from one another within the image 215. In some embodiments, the image 215 can have dimensions of three inches by three inches, four inches by four inches, or other suitable dimensions for fitting on the substrate 200, with an optional border 222 of bare substrate 200 or another material.

In some embodiments, the surface treatment 210 can include a light-absorptive material 225, such as black chromium plating (such as AnoBlack® Cr from ANOPLATE® of Syracuse, New York), electrolytic coloring, low-reflective light-absorbing inorganic black coating sold by CERAKOTE® of White City, Oregon as product number LR-100, and/or another black or dark coating suitable for the relevant environment (e.g., suitable for a space environment), and having low emissivity and high absorptivity relative to the substrate 200 and/or other materials on the substrate 200. In some embodiments, the light-absorptive material 225 can absorb heat from the sun, so that it emits light in the infrared spectrum (e.g., LWIR).

In some embodiments, the surface treatment 210 can include a reflective material 230, such as a white coating, which can include inorganic white thermal control paint (e.g., AZ-93 sold by AZ TECHNOLOGY™ of Huntsville, Alabama), a reflective polyurethane coating (e.g., Aeroglaze® A276 sold by SOCOMORE® of France), and/or another white or light coating suitable for the relevant environment (e.g., suitable for a space environment), and having high emissivity and low absorptivity relative to the substrate 200 and/or other materials on the substrate 200. The contrast between the light-absorptive material 225 and the reflective material 230 can be visible to the imager 155, e.g., in LWIR. In some embodiments, the reflective material 230 can be omitted, and portions of the image 215 can include the bare substrate 200 (e.g., bare uncoated metal). In some embodiments, the bare substrate 200 can function as a reflective material.

In some embodiments, the light-absorptive material 225 can have an emissivity of 0.05 and a solar radiation absorption coefficient of 0.98, or other suitable values. In some embodiments, the reflective material 230 can have an emissivity of 0.88, or greater than 0.94, and a solar radiation absorption coefficient between 0.20 and 0.23, or other suitable values. The emissivity and absorption values disclosed herein are non-limiting and are for example only. In general, the light-absorptive material 225 can have emissivity characteristics less than the emissivity characteristics of the reflective material 230, and/or the light-absorptive material 225 can have a greater solar radiation absorption coefficient than the solar radiation absorption coefficient of the reflective material 230.

In some embodiments, the selection of the light-absorptive material 225 and/or of the reflective material 230 can be based in part on their respective reflectance characteristics. For example, in some embodiments, the reflective material 230 can have a reflectance factor less than 0.06 and an emissivity factor of 0.94 within the infrared light spectrum. In some embodiments, the substrate 200 may be, or may include, stainless steel with an emissivity factor of 0.35 and a reflectance factor of 0.65.

With reference to FIG. 2B, in some embodiments, the marker 150 is thermally connected to a heat source 235 (illustrated schematically in FIG. 2B). The heat source 235 need not be an active heat source (e.g., a powered heater) intended for providing heat to the marker 150. Rather, in some embodiments, the heat source 235 can include a thermal connection (e.g., a thermally conductive connection) to a body or frame of the vehicle (e.g., a body or frame of a spacecraft), or to another feature of the vehicle that generates heat which is transferred to the marker 150 as a result of its routine operation. For example, some spacecraft are a source of heat of about 10 degrees Celsius by nature of their normal operation (e.g., 10 degrees Celsius is a common minimal temperature for spacecraft). In other words, the heat source 235 can be the bulk temperature of the overall vehicle (e.g., a temperature of the structural body of the vehicle). In some embodiments, the marker 150 is connected to a spacecraft such that the marker 150 is heated to approximately 10 degrees Celsius. This makes the marker 150 a passively-heated device, rather than an actively heated device (i.e., the marker 150 does not require its own active heat source).

C. Viewing and Interpreting the Fiducial Markers

Figure 3:
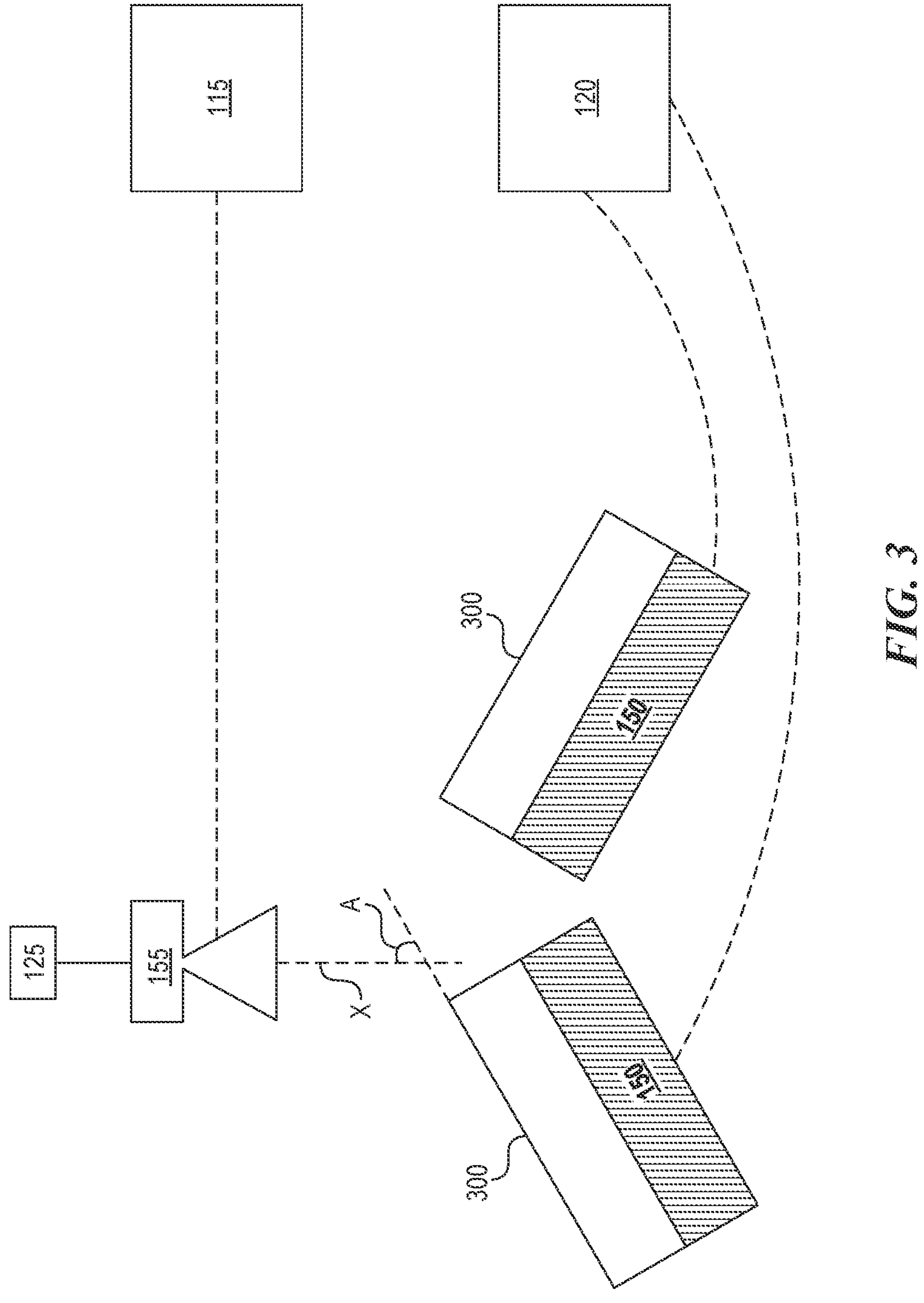
FIG. 3 illustrates a schematic view of an arrangement of fiducial markers, an imager, one or more controllers, and couplers for docking the vehicles together, configured in accordance with embodiments of the present technology.

FIG. 3 illustrates a schematic view of an arrangement of markers 150, the imager 155, the controller system 125, and the couplers 115, 120, in accordance with embodiments of the present technology. The imager 155 can be carried by or otherwise connected to the first coupler 115, or carried by or coupled to the first vehicle 100 (see FIG. 1). One or more (e.g., two or more) markers 150 can be carried by or otherwise connected to the second coupler 120, or carried by or coupled to the second vehicle 105 (see FIG. 1.)

In some embodiments, the imager 155 includes an LWIR imager positionable and/or configurable to view the markers 150. Because the markers 150 are heated (passively or intentionally), the light-absorptive material 225 having low emissivity can appear to the imager as darkness in the LWIR) spectrum), while the reflective material 230 can appear to the imager as light in the LWIR spectrum. In embodiments that do not include the reflective material 230 and instead have bare substrate 200 (e.g., bare metal or another substrate having more reflectivity than the light-absorptive material 225) forming the image 215, the bare substrate can appear to the imager as brightness in the LWIR spectrum.

The resulting pattern of blocks 220 forming the image 215 in the surface treatment 210 can be viewed by the imager 155 and interpreted by the controller system 125 to determine the pose and position of the markers 150 using known techniques associated with ArUco patterns, for example. The entirety of the markers 150 can be approximately the same uniform temperature, but the coating(s) forming the pattern of blocks 220 in the image 215 cause different radiation output that the imager 155 visualizes as contrast in the LWIR spectrum. In other words, the image 215 and the pattern of blocks 220 is visible in infrared light in a spectrum between 8000 nanometers and 14,000 nanometers when the fiducial marker is heated above an ambient or background temperature.

In some embodiments, the imager 155 may view the markers 150 at oblique angles relative to the imager 155 (i.e., relative to an imager 155 centerline X), as generally illustrated in FIG. 3. In other embodiments, the imager 155 may view the markers 150 straight on. Viewing the markers 150 at oblique angles, such as an angle A between 60 and 90 degrees can form a compromise between too much reflection and insufficient emissivity. However, other embodiments can use other suitable angles A or ranges of angles A. In some embodiments, in addition to the oblique angle arrangement, or as an alternative to the oblique angle arrangement, a system implementing the markers 150 can include a wire grid polarizer 300 positioned between the imager 155 and the marker(s) 150 to minimize reflection while still allowing sufficient emissions to reach the imager 155.

In some embodiments, a polarizer 300 may be omitted, and/or the reflective material 230 may be selected to have properties that minimize spectral reflection and maximize diffused reflection. In general, for several embodiments, it may be desirable to maximize diffusion of light reflected from the reflective material 230 to improve the accuracy in analyzing the image 215 via the imager 155.

Figure 4:
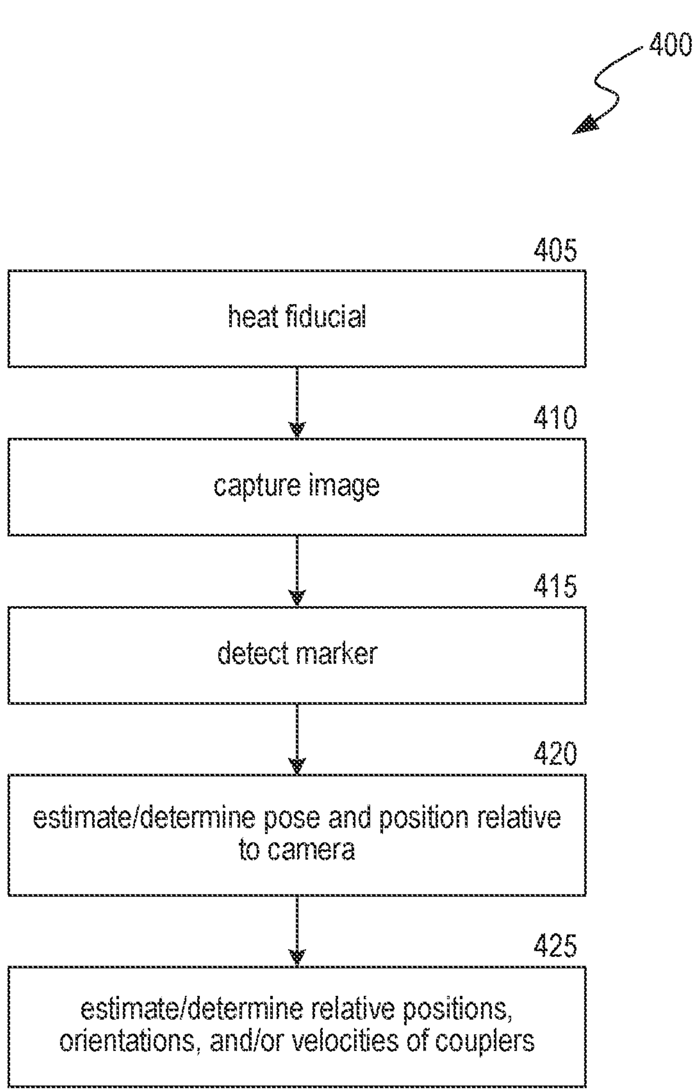
FIG. 4 illustrates a method of determining relative pose and position of the one or more fiducial markers according to embodiments of the present technology.

FIG. 4 illustrates a method 400 of determining relative pose and position of the one or more markers 150, according to embodiments of the present technology. At block 405, the heat source 235 warms/heats the marker 150 above an ambient or background temperature in the field of view behind the marker 150, e.g., to about 10 degrees Celsius or more. The heating generates contrast in the LWIR spectrum. Next, at block 410, the imager 155 captures an image of the marker 150. Next, at block 415, one or more controllers (e.g., of the controller system 125) detect the marker 150 in the image from the imager 155 and perform an ArUCo marker detection and analysis algorithm known in the art, or another suitable algorithm depending on the nature of the image 215 (e.g., if the pattern is different from the ArUCo pattern).

Next, at block 420, the one or more controllers (e.g., of the controller system 125) estimate and/or determine the pose and/or position of the marker(s) 150 relative to the frame of reference (e.g., coordinate system) of the imager 155. For example, a person of ordinary skill in the art understands how to determine positions and/or orientations of edges of the marker 150 using the size of the marker and a focal length of the imager 155 and analysis techniques conventionally associated with the ArUCo pattern. Next, at block 425, using the now-determined position and/or orientation of the marker 150 relative to the imager 155, and using a previously-determined position and/or orientation of the imager 155 relative to the first coupler 115 and/or the first vehicle 100, and using a previously-determined position and/or orientation of the marker 150 relative to the second coupler 120 and/or the second vehicle 105, the relative positions and/or orientations of the couplers 115, 120 to each other and/or the relative positions of the vehicles 100, 105 to each other is determined using conventional coordinate system math and geometry.

In some embodiments, relative velocities of the couplers 115, 120 and/or the vehicles 100, 105 is determined using a plurality of measurements of position and/or orientation over time using conventional coordinate system math and geometry. Accordingly, the method 400 provides one or more controllers (e.g., of the controller system 125), other systems, and/or operators with position, orientation, and/or velocity information for controlling the docking maneuver between the vehicles 100, 105 (e.g., between the couplers 115, 120).

In some embodiments, the control system 125 (see FIG. 1) is programmed with instructions that, when executed, cause the imager 155 to observe the marker 150, then determine, from observation of the marker 150 by the imager 155, a position and/or an orientation of: (a) the marker 150 relative to the imager 155, (b) the first coupler 115 relative to the second coupler 120, and/or (c) the first vehicle 100 relative to the second vehicle 105. Based on the determination of the position, the orientation, and/or the velocity, the control system 125 can control navigation of at least one of the vehicles 100, 105 to dock them together using the couplers 115, 120 and suitable propulsion systems carried by the at least one of the vehicles 100, 105.

C. Methods for Manufacturing the Markers

Figure 5:
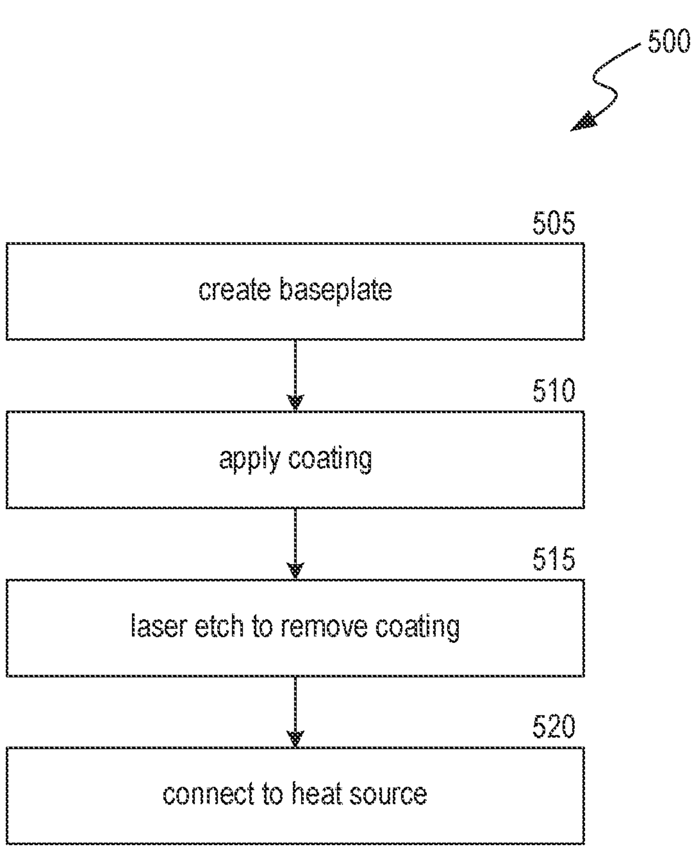
FIG. 5 illustrates a method of making and connecting a fiducial marker in accordance with embodiments of the present technology.

FIG. 5 illustrates a method 500 of making and connecting a marker (e.g., 145, 150) for implementation in suitable systems in accordance with embodiments of the present technology. Beginning at block 505, the method 500 can include creating the substrate 200, which can be in the form of a baseplate. In some embodiments, creating the substrate 200 can include machining a 0.125 inch metal baseplate from stainless steel, an aluminum alloy, or another material described above suitable for making the substrate 200. In other embodiments, the baseplate can have a different thickness and/or be composed of other suitable materials. In some embodiments, a waterjet can cut the shape of the substrate 200.

Next, at block 510, the method 500 can include applying a coating or otherwise adding a surface treatment to the substrate 200. For example, the method 500 can include applying a coating of the light-absorptive material 225 described above with regard to FIGS. 2A and 2B. Next, at block 515, the method 500 can removing the coating (e.g., the light-absorptive material 225) from selected portions of the substrate 200 to form the image 215 (e.g., a pattern of blocks 220) described above with regard to FIGS. 2A and 2B. In some embodiments, the method 500 can include using a laser etching machine and/or process. In some embodiments, with brief reference to FIG. 2A, the method 500 can also include removing coating material around the image 215 to form the border 222. Removing the coating can leave the bare substrate 200 (e.g., bare stainless steel). Then, at block 520, the finished marker (e.g., 145, 150) can be connected to a heat source 235 described above with regard to FIGS. 2A and 2B.

In another method according to other embodiments, the bare substrate 200 can first be coated with the light-absorptive material 225, then part of the image 215 can be masked off (e.g., portions or blocks 220 can be masked off, leaving the pattern exposed, or the pattern of blocks 220 can be masked, leaving the other blocks 220 exposed). Then the reflective material 230 can be applied to the unmasked portions, and the mask can be removed, resulting in the finished image 215 on the substrate 200. The finished marker (e.g., 145, 150) can be connected to the heat source 235.

Aspects of embodiments of the present technology provide several advantages. Because the marker (e.g., 145, 150) is heated the marker is its own emitter for the LWIR imager, which may not need its own emitter. Visible markers may not be compatible with LWIR, but embodiments of the present technology can be visible in the human visible spectrum and visible in LWIR. The ability to use passive heating from the spacecraft enables more efficient missions by not requiring a dedicated heat source that would draw significant power. Vehicles implementing embodiments of the present technology do not need to dedicate substantial energy and weight budgets to heating fiducial markers. Embodiments of the present technology can be robust to half a pixel (e.g., half a block 220) or better.

Some or all of the foregoing processes can be completed automatically, or semi-automatically, for example, via the controllers described above with reference to FIG. 1. In some embodiments, the entire process can be automated, and in other embodiments, human operators can oversee and/or control one or more of the foregoing processes, and can interrupt the processes in the event the automated system produces undesired actions.

In any of the foregoing embodiments, when the two space vehicles are coupled, fluids can be transferred (as discussed above). In addition, or alternatively, the couplers can include interfaces for transferring power and/or data between the vehicles. Other embodiments can include interfaces for transferring other things.

F. Conclusion

From the foregoing, it will be appreciated that some embodiments of the present technology have been described herein for purposes of illustration, but various modifications can be made without deviating from the disclosed technology. For example, although spacecraft are discussed, embodiments of the present technology can be implemented in or on land vehicles, adjusting the temperature of the markers 145, 150 accordingly to be above ambient or background temperature. Other suitable coatings for creating contrast in the LWIR spectrum may be implemented. In further embodiments, other light spectrums may be utilized and contrast may be created using other coatings suitable for those other light spectrums. Methods according to embodiments of the present technology can be performed in other suitable orders different from those disclosed herein, and/or one or more steps of the methods can be performed simultaneously, or one or more steps can be omitted.

Further, while advantages associated with some embodiments of the technology have been described in the context of those embodiments, some embodiments may also exhibit said advantages, and not all embodiments need necessarily exhibit such advantages to fall within the scope of the present technology. Accordingly, the present disclosure and associated technology can encompass other embodiments not expressly described or shown herein.

As used herein, the term "and/or" when used in the phrase "A and/or B" means "A, or B, or both A and B." A similar manner of interpretation applies to the term "and/or" when used in a list of more than two terms. As used herein, the terms "about" and "approximately" refer to values within 10% of the stated value. Where the context permits, singular or plural terms may also include the plural or singular term, respectively. Numerical adjectives including "first" and "second," or the like, as used in the present disclosure, do not convey hierarchy or specific features or functions. Rather, such numerical adjectives are intended to aid the reader in distinguishing between elements which may have similar nomenclature, but which may differ in position, orientation, or structure. Accordingly, such numerical adjectives may be used differently in the claims. To the extent any materials incorporated herein by reference conflict with the present disclosure, the present disclosure controls.

We claim:

1. A system for docking a first spacecraft to a second spacecraft, the system comprising:
- a first coupler configured to be carried by a first spacecraft;
- a second coupler configured to be carried by a second spacecraft, wherein the first coupler is configured to engage the second coupler;
- a fiducial marker configured to be carried by the second spacecraft and configured to be thermally connected to a heat source carried by the second spacecraft, wherein the fiducial marker comprises a metal substrate and a surface treatment forming a computer-readable image on the metal substrate; and
- an imager configured to be carried by the first spacecraft and positionable to view the fiducial marker;

wherein:
- the computer-readable image comprises a pattern of a plurality of blocks;
- one or more first blocks of the plurality of blocks includes a first coating having a first emissivity and a first solar radiation absorption coefficient;
- one or more second blocks of the plurality of blocks is uncoated or includes a second coating that has a second emissivity and a second solar radiation absorption coefficient;
- the first emissivity is less than the second emissivity; and
- the first solar radiation absorption coefficient is greater than the second solar radiation absorption coefficient.

2. The system of claim 1, wherein the heat source comprises a thermal connection to a body or a frame of the second spacecraft.

3. The system of claim 1, wherein the system does not include a powered heater for heating the fiducial marker, and wherein the fiducial marker is configured to be heated only by a bulk temperature of the second spacecraft.

4. The system of claim 1, further comprising one or more controllers programmed with instructions that, when executed:
- cause the imager to observe the fiducial marker;
- determine, from observation of the fiducial marker by the imager, at least one of a position or an orientation of: (a) the fiducial marker relative to the imager, (b) the first coupler relative to the second coupler, or (c) the first spacecraft relative to the second spacecraft; and
- control navigation of at least one of the first spacecraft or the second spacecraft to dock the first spacecraft with the second spacecraft using the first coupler and the second coupler.

5. The system of claim 1, wherein the fiducial marker is carried by the second coupler.

6. The system of claim 1, wherein the imager is operable to detect or produce images based on infrared light in a spectrum between 8000 nanometers and 14,000 nanometers.

7. The system of claim 1, wherein the metal substrate comprises aluminum or stainless steel.

8. The system of claim 1, wherein the computer-readable image comprises an ArUCo pattern.

9. The system of claim 1, wherein the one or more first blocks includes a plating or an electrolytic coating.

10. The system of claim 1, wherein the system further comprises a polarizer, and wherein the surface treatment is positioned between the polarizer and the metal substrate.

11. A fiducial marker system for docking a first spacecraft to a second spacecraft, the fiducial marker system comprising a fiducial marker configured to be carried by the second spacecraft, wherein the fiducial marker comprises:
- a metal substrate; and
- a surface treatment forming a computer-readable image on the metal substrate;

wherein:
- the computer-readable image comprises a pattern of a plurality of blocks;

one or more first blocks of the plurality of blocks includes a first coating having a first emissivity and a first solar radiation absorption coefficient;

one or more second blocks of the plurality of blocks is uncoated or includes a second coating that has a second emissivity and a second solar radiation absorption coefficient;

the first emissivity is less than the second emissivity; and the first solar radiation absorption coefficient is greater than the second solar radiation absorption coefficient.

12. The fiducial marker system of claim 11, wherein the metal substrate comprises aluminum or stainless steel.

13. The fiducial marker system of claim 11, wherein the pattern of the plurality of blocks forms an ArUCo pattern.

14. The fiducial marker system of claim 11, further comprising an imager configured to be carried by the first spacecraft and positionable to view the fiducial marker, wherein the imager is operable to detect or produce images based on infrared light in a spectrum between 8000 nanometers and 14,000 nanometers.

15. The fiducial marker system of claim 14, further comprising one or more controllers programmed with instructions that, when executed:

cause the imager to observe the fiducial marker; and determine, from observation of the fiducial marker by the imager, at least one of a position or an orientation of: (a) the fiducial marker relative to the imager, (b) a first coupler of the first spacecraft relative to a second coupler of the second spacecraft, or (c) the first spacecraft relative to the second spacecraft.

16. The fiducial marker system of claim 11, further comprising a heat source carried by the second spacecraft and thermally connected to the fiducial marker.

17. The fiducial marker system of claim 16, wherein the heat source comprises a thermal connection to a body or a frame of the second spacecraft.

18. The fiducial marker system of claim 16, wherein the fiducial marker is not thermally connected to a powered heater, wherein heat transferred to the fiducial marker from the heat source is only from a bulk temperature of the second spacecraft.

19. The fiducial marker system of claim 11, wherein the one or more first blocks includes a plating or an electrolytic coating.

20. The fiducial marker system of claim 11, further comprising a polarizer, wherein the surface treatment is positioned between the polarizer and the metal substrate.

21. A method of making a fiducial marker for a spacecraft, the method comprising:

forming a substrate from a metal material;

applying a first coating of a light-absorptive material to one or more portions of the substrate, the light-absorptive material having a first emissivity and a first solar radiation absorption coefficient; and forming a computer-readable image on the substrate, wherein forming the computer-readable image comprises forming a pattern of a plurality of blocks;

wherein forming the pattern of the plurality of blocks comprises at least one of:

(a) removing one or more portions of the first coating from the substrate to expose the substrate beneath the one or more portions of the first coating, wherein the substrate has a second emissivity and a second solar radiation absorption coefficient; or (b) masking over some of the first coating with a masking material, applying a second coating over the first coating or the substrate, and removing the masking material, wherein the second coating has a second emissivity and a second solar radiation absorption coefficient; and wherein the first solar radiation absorption coefficient is different from the second solar radiation absorption coefficient, and wherein the first emissivity is different from the second emissivity.

22. The method of claim 21, wherein the computer-readable image comprises an ArUCo pattern visible in infrared light in a spectrum between 8000 nanometers and 14,000 nanometers when the fiducial marker is heated above an ambient or background temperature.

23. The method of claim 21, wherein removing the one or more portions of the first coating comprises laser etching the one or more portions of the first coating.

* * * * *